(12) United States Patent
Toshioka et al.

(10) Patent No.: US 10,461,292 B2
(45) Date of Patent: Oct. 29, 2019

(54) ENERGY STORAGE APPARATUS AND COVER MEMBER

(71) Applicants: GS Yuasa International Ltd., Kyoto-shi (JP); Honda Motor Co., Ltd., Tokyo (JP)

(72) Inventors: Yoshimasa Toshioka, Kyoto (JP); Sunao Teraguchi, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 15/352,464

(22) Filed: Nov. 15, 2016

(65) Prior Publication Data

US 2017/0141371 A1    May 18, 2017

(30) Foreign Application Priority Data

Nov. 16, 2015    (JP) .................................. 2015-223900

(51) Int. Cl.

| | |
|---|---|
| H01M 2/10 | (2006.01) |
| H01M 2/14 | (2006.01) |
| H01M 2/20 | (2006.01) |
| H01G 11/08 | (2013.01) |
| H01G 11/10 | (2013.01) |
| H01G 11/76 | (2013.01) |
| H01G 11/82 | (2013.01) |

(52) U.S. Cl.
CPC .............. *H01M 2/14* (2013.01); *H01G 11/08* (2013.01); *H01G 11/10* (2013.01); *H01G 11/76* (2013.01); *H01G 11/82* (2013.01); *H01M 2/1016* (2013.01); *H01M 2/202* (2013.01)

(58) Field of Classification Search
CPC ...... H01M 2/14; H01M 2/1016; H01M 2/202; H01G 11/00
See application file for complete search history.

(56) References Cited

U.S. PATENT DOCUMENTS

| | | | |
|---|---|---|---|
| 2013/0095359 A1 | 4/2013 | Yoshioka et al. | |
| 2013/0273404 A1* | 10/2013 | Ochi ....................... | H01M 2/14 429/99 |
| 2014/0329136 A1 | 11/2014 | Kinoshita et al. | |
| 2014/0335393 A1 | 11/2014 | Wada et al. | |

(Continued)

FOREIGN PATENT DOCUMENTS

| | | |
|---|---|---|
| JP | H 06-243851 A | 9/1994 |
| JP | 2003-161073 A | 6/2003 |

(Continued)

*Primary Examiner* — Muhammad S Siddiquee
(74) *Attorney, Agent, or Firm* — McGinn IP Law Group, PLLC

(57) ABSTRACT

An energy storage apparatus includes: a spacer; an energy storage device disposed adjacently to the spacer in a first direction and having an external terminal; and a cover member holding a bus bar connected to the external terminal and extending along the energy storage device, wherein the spacer has a first connecting portion to which the cover member is connected on an end portion thereof in a second direction, and the cover member has a second connecting portion which engages with the first connecting portion in a state where movement of the cover member in a direction away from the spacer in the second direction is restricted.

18 Claims, 10 Drawing Sheets

(56) References Cited

U.S. PATENT DOCUMENTS

| | | |
|---|---|---|
| 2014/0363723 A1 | 12/2014 | Imai et al. |
| 2016/0093855 A1* | 3/2016 | Tononishi ............ H01M 2/1077 |
| | | 429/156 |
| 2016/0133905 A1 | 5/2016 | Shitamichi et al. |
| 2016/0133907 A1 | 5/2016 | Shitamichi et al. |
| 2016/0218337 A1 | 7/2016 | Morisaku et al. |
| 2016/0359149 A1* | 12/2016 | Shao .................... H01M 2/1077 |

FOREIGN PATENT DOCUMENTS

| | | |
|---|---|---|
| JP | 2004-262509 A | 9/2004 |
| JP | 4775070 B2 | 9/2011 |
| JP | WO 2012/057322 A1 | 5/2012 |
| JP | 2013-084595 A | 5/2013 |
| JP | 2013-105545 A | 5/2013 |
| JP | 2013-191422 A | 9/2013 |
| JP | 2013-247056 A | 12/2013 |
| JP | 2014-220067 A | 11/2014 |
| JP | 2014-220069 A | 11/2014 |
| JP | 2014-238986 A | 12/2014 |
| JP | 2015-002162 A | 1/2015 |
| JP | 2015-002164 A | 1/2015 |
| JP | 2015-018631 A | 1/2015 |
| JP | 2015-053131 A | 3/2015 |
| JP | 5757252 B2 | 7/2015 |
| JP | 2015-153554 A | 8/2015 |
| JP | 2015-153618 A | 8/2015 |
| JP | 5772524 B2 | 9/2015 |
| WO | WO 2013/084941 A1 | 6/2013 |
| WO | WO 2013/180158 A1 | 12/2013 |
| WO | WO 2014/181707 A1 | 11/2014 |
| WO | WO 2014/181807 A1 | 11/2014 |
| WO | WO 2015/122314 A1 | 8/2015 |

\* cited by examiner

ENERGY STORAGE APPARATUS AND COVER MEMBER

CROSS-REFERENCE TO RELATED APPLICATIONS

This application claims the benefit of Japanese patent application No. 2015-223900, filed on Nov. 16, 2015, which is incorporated by reference.

FIELD

The present invention relates to an energy storage apparatus provided with energy storage devices, and a cover member which covers the energy storage devices in the energy storage apparatus.

BACKGROUND

Conventionally, there has been known a power source apparatus provided with a bus bar module (see JP 2014-238986 A). To be more specific, as shown in FIG. 14, this power source apparatus includes a battery assembly 602 which is formed by disposing a plurality of prismatic batteries 601 in a row, and a bus bar module 610 mounted on an upper surface of the battery assembly 602.

Each of the plurality of batteries 601 has a positive electrode 603 and a negative electrode 604 on both ends of an upper surface in a width direction. In the battery assembly 602, the positive electrodes 603 and the negative electrodes 604 are disposed in two rows in a stacking direction of the batteries 601 (hereinafter, referred to as "first direction") such that the positive electrode 603 and the negative electrode 604 are disposed alternately on a straight line.

The bus bar module 610 includes: a plurality of bus bars 611 which connect the plurality of batteries 601 in series by connecting the positive electrode 603 and the negative electrode 604 of the batteries 601 disposed adjacently to each other; and a case 613 which houses the plurality of bus bars 611. In each of the plurality of bus bars 611, a pair of through holes 612 into which the positive electrode 603 and the negative electrode 604 which are electrodes disposed adjacently to each other are inserted is formed in a plate-like metal. The case 613 is formed into an approximately rectangular shape substantially equal to a shape of the upper surface of the battery assembly 602. The case 613 is made to overlap with the upper surface of the battery assembly 602. A plurality of bus bar housing portions 614 are disposed on a straight line on edge portions of the case 613 in a width direction. That is, the plurality of bus bar housing portions 614 are disposed in two rows spaced apart from each other in a width direction of the bus bar module 610 in the case 613.

In the bus bar module 610 having the above-mentioned configuration, the positive electrodes 603 and the negative electrodes 604 of the batteries 601 are inserted into the through holes 612 formed in the bus bars 611, and nuts 605 are threadedly engaged with the positive electrodes 603 and the negative electrodes 604 so that the bus bar module 610 is mounted on the upper surface of the battery assembly 602.

However, in the power source apparatus 600, the bus bar module 610 is fixed to the battery assembly 602 only at both end portions in the width direction (that is, not fixed at a center portion in the width direction). Accordingly, variations in size at respective positions (to be more specific, variations in height at the respective positions in the first direction) are generated so that there may be a case where it is difficult to insert the power source apparatus 600 into an installation space at the time of installing the power source apparatus 600.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus which can suppress variations in size at respective positions, and a cover member which is used in the energy storage apparatus.

An energy storage apparatus according to an aspect of the present invention includes: a spacer; an energy storage device disposed adjacently to the spacer in a first direction and having an external terminal on an end surface thereof in a second direction orthogonal to the first direction; and a cover member holding a bus bar connected to the external terminal and extending along the end surface of the energy storage device having the external terminal, wherein the spacer has a first connecting portion to which the cover member is connected on an end portion thereof in the second direction, and the cover member has a second connecting portion which engages with the first connecting portion in a state where movement of the cover member in a direction away from the spacer in the second direction is restricted.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
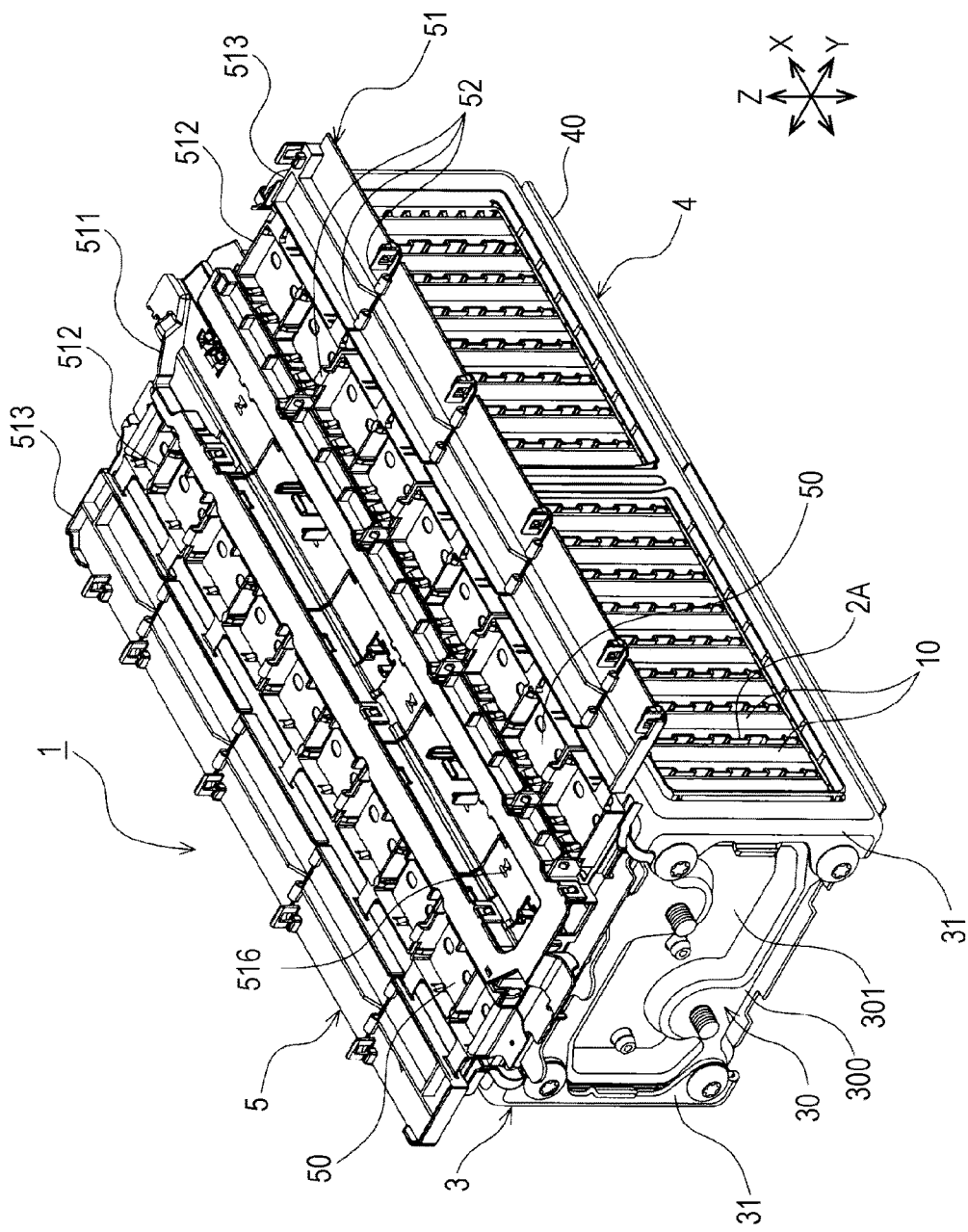
FIG. 1 is a perspective view of an energy storage apparatus according to an embodiment of the present invention.

According to an aspect of the present invention, there is provided an energy storage apparatus which includes: a spacer; an energy storage device disposed adjacently to the spacer in a first direction and having an external terminal on an end surface thereof in a second direction orthogonal to the first direction; and a cover member holding a bus bar connected to the external terminal and extending along the end surface of the energy storage device having the external terminal, wherein the spacer has a first connecting portion to which the cover member is connected on an end portion thereof in the second direction, and the cover member has a second connecting portion which engages with the first connecting portion in a state where movement of the cover member in a direction away from the spacer in the second direction is restricted.

In the energy storage apparatus, one of the first connecting portion and the second connecting portion may have a pair of contact surfaces which is brought into contact with the other of the first connecting portion and the second connecting portion from both sides in the first direction.

In the energy storage apparatus, the spacer may be formed of a plurality of spacers disposed in a row in the first direction, at least two spacers among the plurality of spacers respectively may have the first connecting portion, and the cover member may have a plurality of second connecting portions disposed at positions respectively corresponding to the first connecting portions of the at least two spacers having the first connecting portions.

In the energy storage apparatus, the cover member may have a plurality of partitioned portions disposed in a row in the first direction, and connecting portions connecting the neighboring partitioned portions to each other and allowing the partitioned portions connectable to each other and separable from each other in the first direction, and the plurality of partitioned portions may be configured to respectively hold the bus bars.

In the energy storage device, the second connecting portion of the cover member may have a locking portion which locks the first connecting portion, and a gap portion disposed adjacently to the locking portion as viewed in the second direction.

In the energy storage device, the first connecting portion may have: a base portion extending from an end portion of the spacer in the second direction; and a large width portion connected to a distal end of the base portion and having a larger size on a surface orthogonal to the second direction than the base portion.

According to another aspect of the present invention, there is provided a cover member of an energy storage apparatus which includes a spacer and an energy storage device disposed adjacently to the spacer in a first direction and having an external terminal on an end surface thereof in a second direction orthogonal to the first direction, the cover member extending along the end surface of the energy storage device having the external terminal, wherein the cover member includes:

a bus bar connected to the external terminal; and a second connecting portion configured to hold the bus bars and to engage with a first connecting portion formed on an end portion of the spacer in the second direction in a state where movement of the cover member in a direction away from the spacer in the second direction is restricted.

As described above, the aspects of the present invention can provide an energy storage apparatus which can suppress variations in size at respective positions and a cover member used in the energy storage apparatus.

Hereinafter, one embodiment of the present invention is described with reference to FIG. 1 to FIG. 11. Names of respective constitutional members (respective constitutional elements) of this embodiment are used for this embodiment, and may differ from names of respective constitutional members (respective constitutional elements) used in BACKGROUND.

Figure 2:
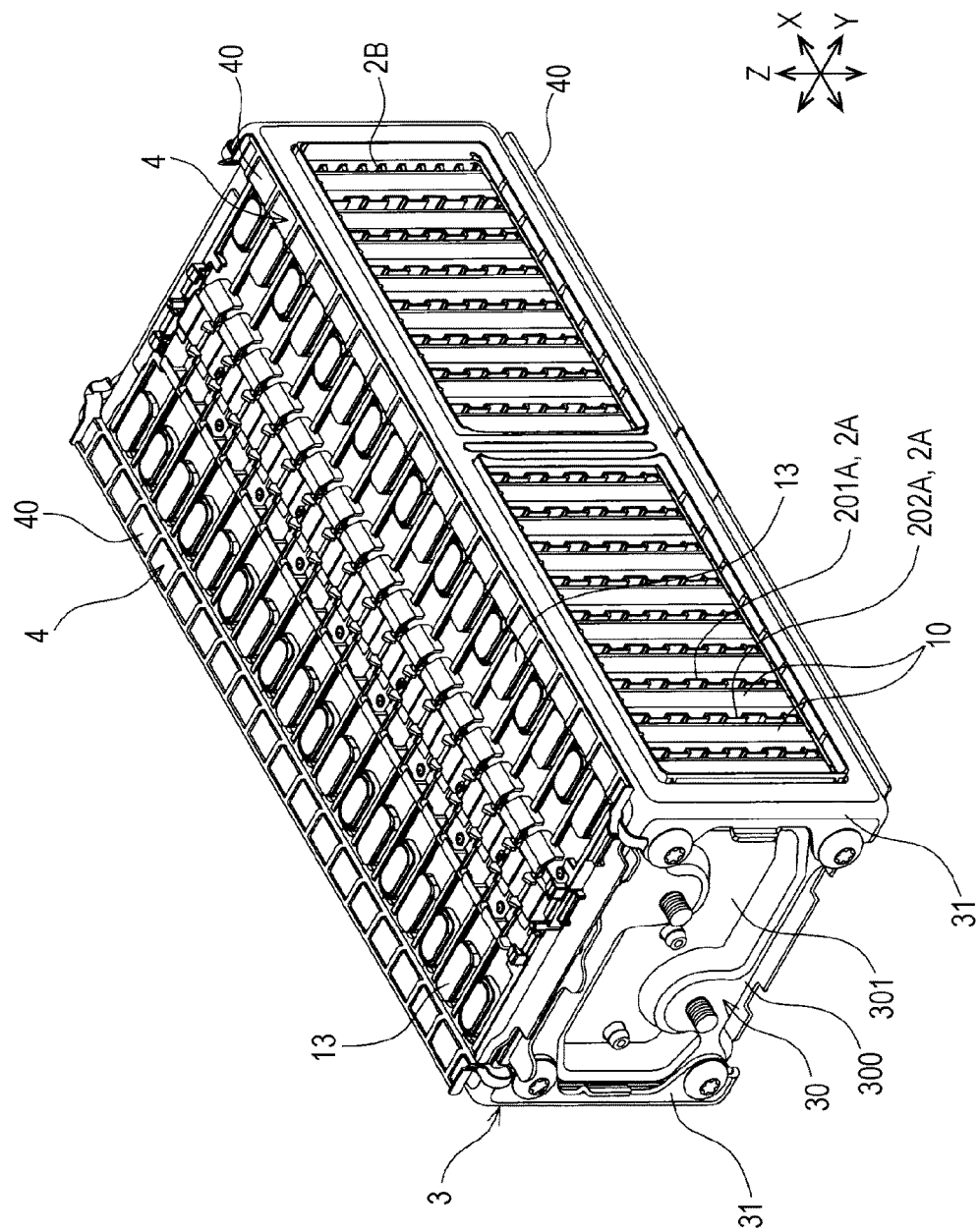
FIG. 2 is a perspective view of the energy storage apparatus in a state where a cover member is removed.
Figure 3:
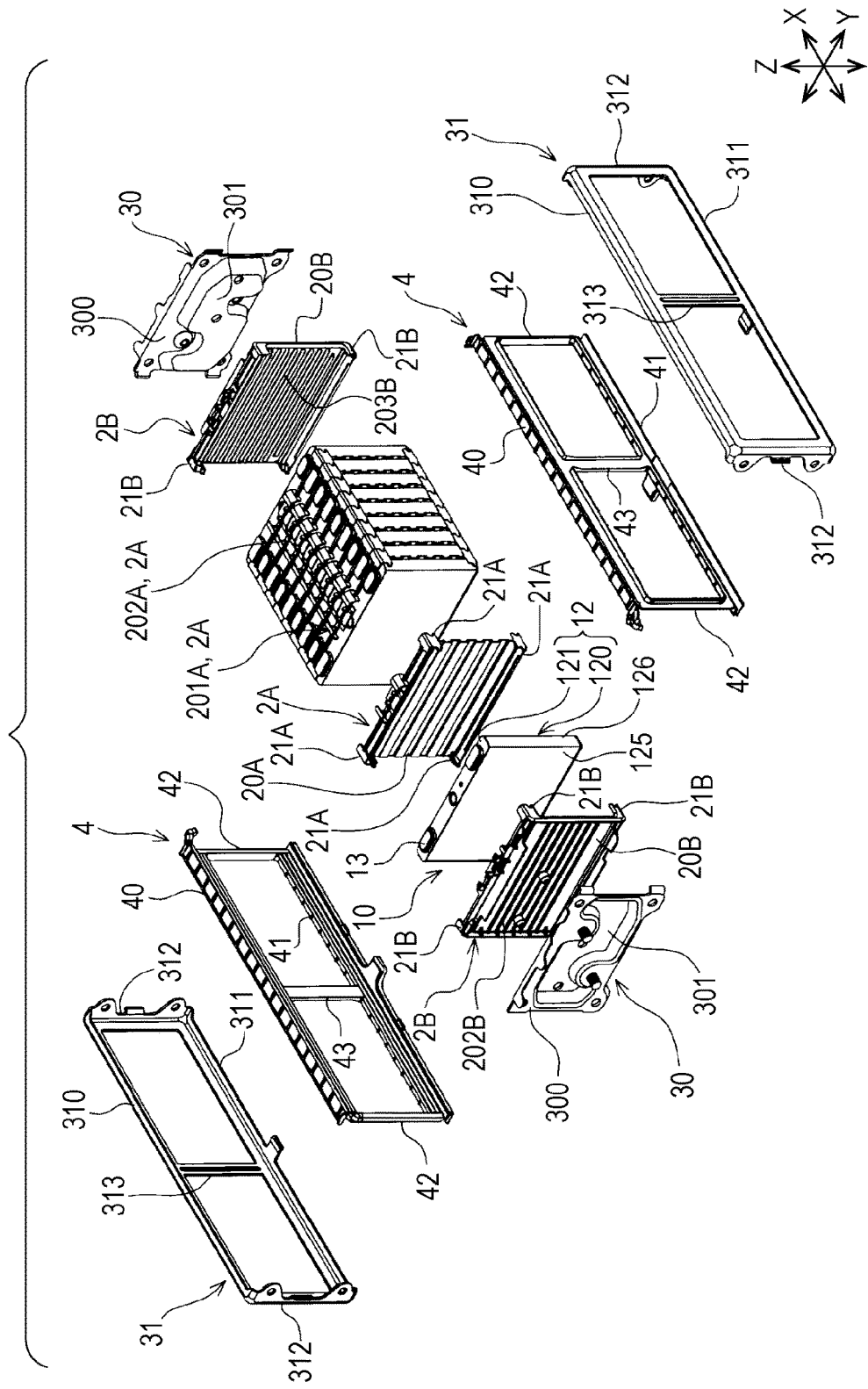
FIG. 3 is a developed perspective view of the energy storage apparatus in a state where the cover member is removed.

As shown in FIG. 1 to FIG. 3, an energy storage apparatus includes: a plurality of inner spacers (spacers) 2A disposed in a row in a first direction (predetermined direction); energy storage devices 10 each of which has external terminals 13 on an end surface thereof in a second direction (vertical direction in FIG. 2) orthogonal to the first direction and is disposed between the inner spacers 2A disposed adjacently to each other; and a cover member 5 which holds bus bars 50 each of which connects the corresponding external terminals 13 to each other. The cover member 5 extends along the end surfaces of the energy storage devices 10 on which the external terminals 13 are mounted. The energy storage apparatus 1 of this embodiment further includes: outer spacers 2B which are disposed adjacently to outermost energy storage devices 10 respectively in the first direction; and a holder 3 which collectively holds the energy storage devices 10 and the spacers (the inner spacers 2A and the outer spacers 2B). The holder 3 is made of a material having conductivity such as metal. Along with such a configuration, the energy storage apparatus 1 includes insulators 4 disposed between the plurality of energy storage devices 10 and the holder 3.

Figure 4:
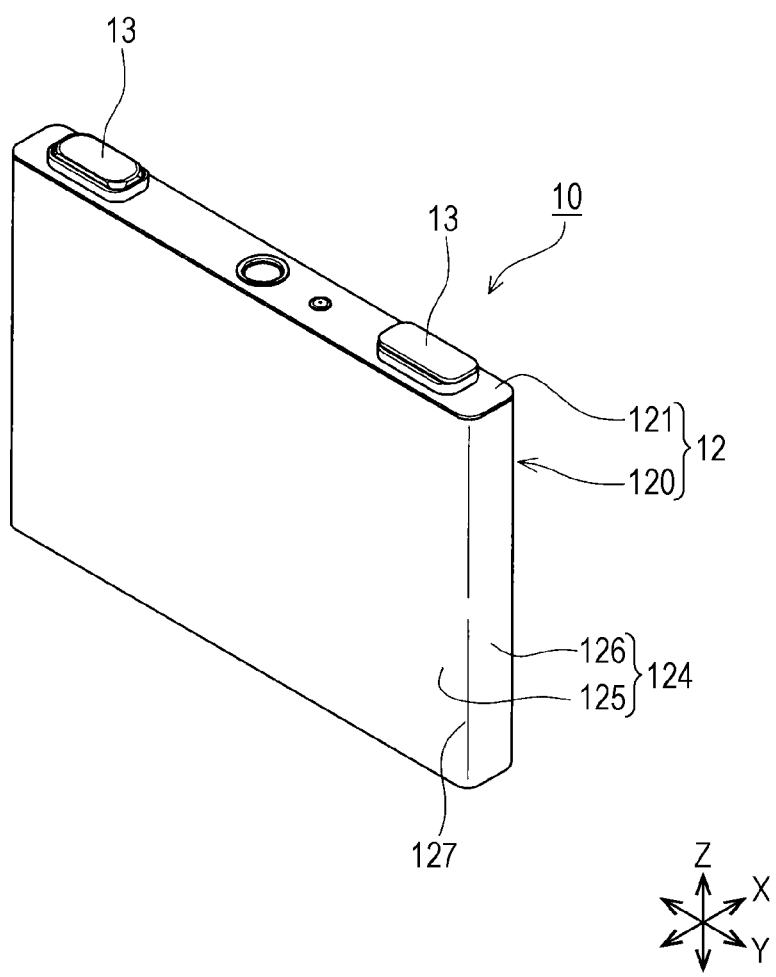
FIG. 4 is a perspective view of an energy storage device which the energy storage apparatus includes.
Figure 5:
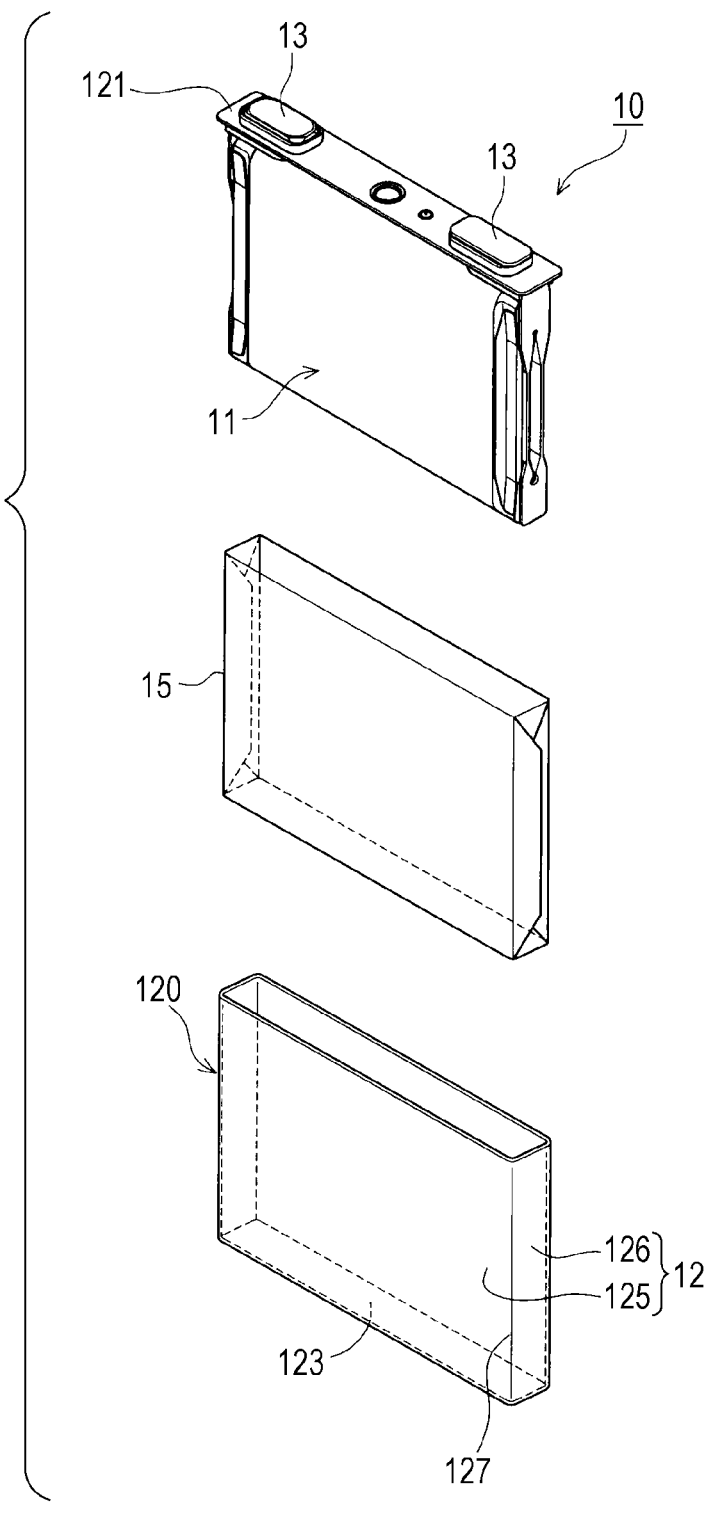
FIG. 5 is a developed perspective view of the energy storage device.

As also shown in FIG. 4 and FIG. 5, each energy storage device 10 includes: an electrode assembly 11 which includes a positive electrode and a negative electrode; a case 12 which houses the electrode assembly 11; and a pair of external terminals 13 disposed on an outer surface of the case 12. The energy storage device 10 further includes an insulating member 15 disposed between the electrode assembly 11 and the case 12.

The case 12 includes: a case body 120 having an opening; and a lid plate 121 which closes the opening of the case body 120.

The case body 120 includes: a plate-like closed portion 123; and a cylindrical barrel portion 124 which is connected to a periphery of the closed portion 123.

The barrel portion 124 includes: a pair of first walls 125 which opposedly faces each other with a distance therebetween; and a pair of second walls 126 which opposedly faces each other with the pair of first walls 125 interposed therebetween. The first walls 125 and the second walls 126 are respectively formed into a rectangular shape. The first wall 125 and the second wall 126 are disposed adjacently to each other in a state where end edges of the first wall 125 and the second wall 126 abut against each other. With respect to the first wall 125 and the second wall 126 which are disposed adjacently to each other, the end edge of the first wall 125 and the end edge of the second wall 126 are connected to each other over the entire length of the first and second walls 125, 126. Accordingly, the barrel portion 124 is formed into a prismatic cylindrical shape. One end of the barrel portion 124 is closed by the closed portion 123, and the other end of the barrel portion 124 is opened. That is, the case body 120 has a bottomed prismatic cylindrical shape. The barrel portion 124 in this embodiment is formed into a flat prismatic cylindrical shape.

The lid plate 121 is a plate-like member which closes the opening of the case body 120. To be more specific, the lid plate 121 has a profile shape which corresponds to a peripheral edge portion of the opening of the case body 120 as viewed in the normal direction. That is, the lid plate 121 is a plate member having a rectangular shape which extends in one direction (the direction along which the pair of second walls 126 opposedly faces each other) as viewed in the normal direction.

A peripheral edge portion of the lid plate 121 is made to overlap with the peripheral edge portion of the opening of the case body 120 so that the opening of the case body 120 is closed, and in such a state, a boundary portion between the lid plate 121 and the case body 120 is welded.

As described previously, the energy storage apparatus 1 of this embodiment includes the plurality of energy storage devices 10 disposed in a row in one direction. The plurality of energy storage devices 10 are disposed in a row in a state where the first wall 125 of the case 12 of each energy storage device 10 is directed in one direction.

In the description made hereinafter, the direction along which the energy storage devices 10 are disposed in a row (first direction) is assumed as "X axis direction" in orthogonal coordinates. Further, the direction along which the second walls 126 of the energy storage device 10 opposedly face each other (third direction) is referred to as "Y axis direction" in orthogonal coordinates, and the direction along which the lid plate 121 and the closed portion 123 opposedly face each other (second direction) is assumed as "Z axis direction" in orthogonal coordinates. In accordance with such orthogonal coordinates, orthogonal coordinate axes which respectively correspond to the X axis direction, the Y axis direction and the Z axis direction are described auxiliarily in the respective drawings.

As shown in FIG. 3, the energy storage apparatus 1 includes two kinds of spacers 2A, 2B. To be more specific, the energy storage apparatus 1 includes: inner spacers 2A each of which is disposed between two energy storage devices 10 disposed adjacently to each other; and the outer spacers 2B which are disposed adjacently to the outermost energy storage devices 10 out of the plurality of energy storage devices 10. In the energy storage apparatus 1 of this embodiment, the plurality of inner spacers 2A are provided and, as shown in FIG. 6, the plurality of inner spacers 2A include first spacers 201A which are not connected with the cover member 5, and second spacers 202A which are connected with the cover member 5.

Figure 6:
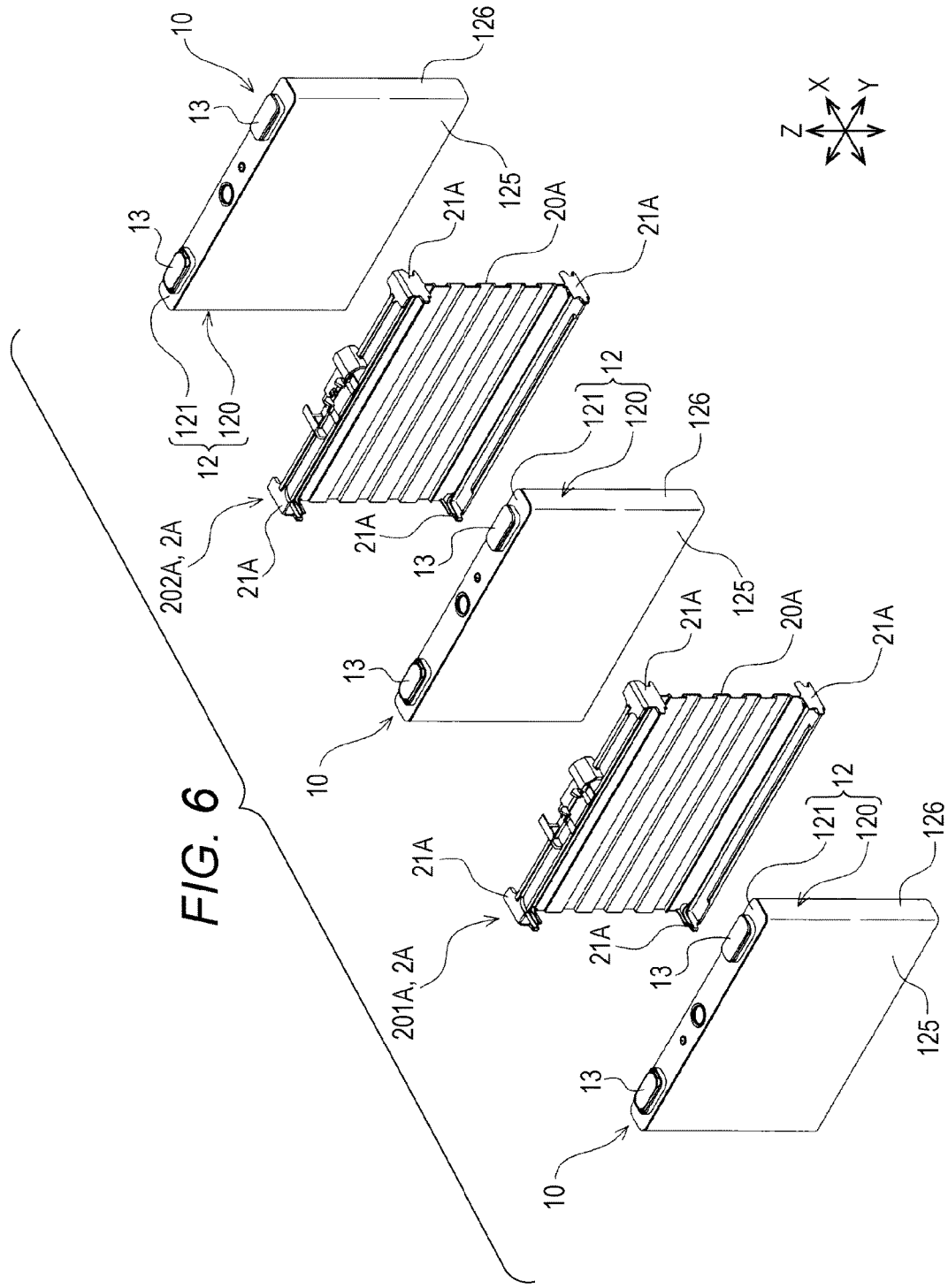
FIG. 6 is a perspective view describing a first spacer and a second spacer.

As shown in FIG. 2, FIG. 3 and FIG. 6, each first spacer 201A includes: a base 20A disposed adjacently to the energy storage devices 10 (to be more specific, first walls 125 of the case bodies 120); and restricting portions 21A which prevent the positional displacement of two energy storage devices 10 disposed adjacently to the base 20A with respect to the base 20A.

The base 20A of the first spacer 201A extends in the direction orthogonal to the X axis direction (the direction along the Y-Z plane (a plane including a Y axis and a Z axis)) between the energy storage devices 10. The base 20A has a first surface which opposedly faces one energy storage device 10 out of two energy storage devices 10 disposed adjacently to the base 20A, and a second surface which opposedly faces the other energy storage device 10 out of two energy storage devices 10. With respect to the base 20A of this embodiment, flow channels through which a fluid (for example, a fluid for regulating a temperature of the energy storage device 10) is allowed to flow are formed in at least one space out of spaces formed between the base 20A and the energy storage devices 10 disposed adjacently to the base 20A on both sides in the X axis direction.

The base 20A has a first end disposed at a position which corresponds to the lid plate 121 of the energy storage device 10, and a second end disposed on a side opposite to the first end at a position which corresponds to the closed portion 123 of the energy storage device 10. The base 20A has a third end disposed at a position which corresponds to the second wall 126 of the energy storage device 10 on one side, and a fourth end disposed on a side opposite to the third end at a position which corresponds to the second wall 126 of the energy storage device 10 on the other side.

The first end and the second end of the base 20A extend in the Y axis direction. The third end and the fourth end of the base 20A extend in the Z axis direction. Accordingly, the base 20A has an approximately rectangular profile as viewed in the X axis direction. The profile of the base 20A has substantially the same size as the first wall 125 of the energy storage device 10 as viewed in the X axis direction.

In the energy storage apparatus 1 of this embodiment, flow channels which allow a fluid (a fluid for regulating a temperature of the energy storage device 10 in the example of this embodiment) to pass therethrough are formed in at least one space out of the space formed between the first surface of the base 20A and the energy storage device 10 and the space formed between the second surface of the base 20A and the energy storage device 10.

The restricting portions 21A extend toward both sides in the X axis direction from the base 20A along end portions of the energy storage devices 10 disposed adjacently to the base 20A in the Y axis direction. To be more specific, the restricting portion 21A is formed on respective corner portions of the base 20A. That is, the inner spacer 2A has the plurality of (four in the example of this embodiment) restricting portions 21A. As described above, these restricting portions 21A prevent the positional displacement of two energy storage devices 10 disposed adjacently to the base 20A with respect to the base 20A in the Y-Z plane direction. Accordingly, the restricting portions 21A restrict the relative movement between two energy storage devices 10 disposed adjacently to the inner spacer 2A in the Y-Z plane direction.

The second spacer 202A includes, in the same manner as the first spacer 201A, a base 20A and restricting portions 21A. The second spacer 202A includes a first connecting portion 22A to which the cover member 5 is connected. That is, the configuration of the second spacer 202A differs from the configuration of the first spacer 210A with respect to a point that the second spacer 202A includes the first connecting portion 22A. Since the base 20A and the restricting portions 21A of the second spacer 202A have the same configuration as the base 20A and the restricting portions 21A of the first spacer 201A, the description is made hereinafter only with respect to the first connecting portion 22A in detail.

Figure 7:
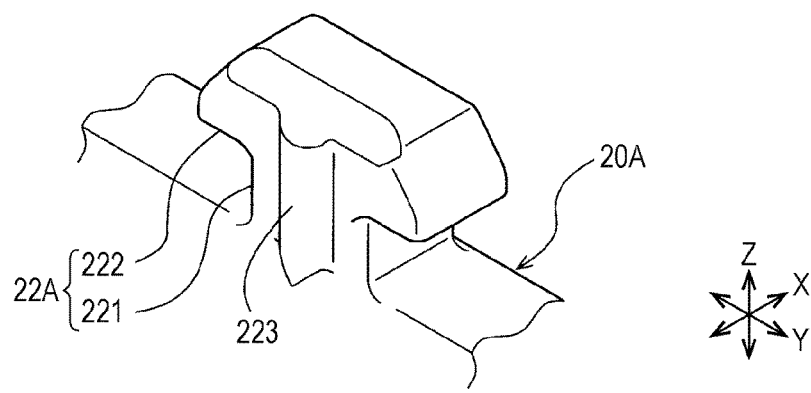
FIG. 7 is an enlarged perspective view of a second connecting portion and a portion around the second connecting portion.

The first connecting portion 22A is disposed at an intermediate position in the Y axis direction on the end portion (an upper end portion in FIG. 6) of the base 20A in the Z axis direction. The first connecting portion 22A of this embodiment is disposed at the center of the end portion of the base 20A in the Y axis direction. To be more specific, as also shown in FIG. 7, the first connecting portion 22A extends in the Y axis direction from the first end of the base 20A (to be more specific, the center position of the first end in the Y axis direction). The first connecting portion 22A is formed of a base portion 221 which extends straightly in the Z axis direction from the first end of the base 20A, and a large width portion 222 which is connected with a distal end of the base portion 221 and has a larger size in the X-Y plane (a plane including the X axis and the Y axis) direction than the base portion 221. The first connecting portion 22A also includes a pair of projecting portions 223 which projects toward both sides in the X axis direction from at least one of the base portion 221 and the large width portion 222. In this embodiment, the projecting portions 223 extend in the Z axis direction on both sides of the base portion 221 and the large width portion 222 in the X axis direction such that each projecting portion 223 extends over the base portion 221 and the large width portion 222.

In this embodiment, the base portion 221 has a rectangular cross section (cross section in the X-Y plane direction) of the same size and shape at respective positions in the Z axis direction. That is, the base portion 221 has a prismatic shape. In this embodiment, the large width portion 222 has the same width as viewed in the Y axis direction as the base portion 221, while a width of the large width portion 222 as viewed in the X axis direction is gradually decreased toward a distal end (an upper end in FIG. 7) from a base portion 221 side in the Z axis direction. An end portion of the large width portion 222 on a base portion 221 side projects toward both sides in the Y axis direction from the base portion 221. That is, a size of the end portion of the large width portion 222 on the base portion 221 side in the Y axis direction is larger than a size of the base portion 221 in the Y axis direction.

Among the plurality of inner spacers 2A which are disposed in a row in the X axis direction in a state where each inner spacer 2A is disposed between the energy storage devices 10, the second spacer 202A is disposed every other storage device or every two or more storage devices 10. In this embodiment, a plurality of second spacers 202A are provided in the energy storage apparatus 1.

As shown in FIG. 3, the outer spacer 2B is disposed adjacently to the inner spacer 2A with the energy storage device 10 interposed therebetween. The energy storage apparatus 1 of this embodiment includes a pair of outer spacers 2B. Each of the pair of outer spacer 2B is disposed adjacently to the outermost energy storage device 10 out of the plurality of energy storage devices 10. That is, the pair of outer spacers 2B is provided so as to sandwich the plurality of energy storage devices 10 disposed in a row in the X axis direction therebetween.

Each outer spacer 2B includes a base 20B which extends in the Y-Z plane direction, and restricting portions 21B which restrict the positional displacement of the energy storage device 10 disposed adjacently to the base 20B. In this embodiment, the base 20B of the outer spacer 2B opposedly faces (is disposed adjacently to) a terminal member 30 included in the holder 3. That is, each outer spacer 2B is disposed between the energy storage device 10 and the terminal member 30.

The base 20B of the outer spacer 2B includes: a plate-like base body 201B which extends in the Y-Z plane direction; outer contact portions 202B which project from one surface of the base body 201B toward the terminal member 30 and are brought into contact with the terminal member 30; and inner contact portions 203B which project from the other surface of the base 20B toward the energy storage device 10 and are brought into contact with the energy storage device 10.

Flow channels which allow the fluid to pass therethrough are formed in a space between the base 20B and the energy storage device 10 disposed adjacently to the base 20B due to the inner contact portions 203B. Further, a gap is formed between the base body 201B of the base 20B and the terminal member 30 due to the outer contact portions 202B.

The restricting portions 21B extend toward the energy storage device 10 disposed adjacently to the base 20B. The restricting portion 21B is formed at respective corner portions of the base 20B (to be more specific, base body 201B). As described previously, the restricting portions 21B prevent the positional displacement of the energy storage device 10 disposed adjacently to the base 20B with respect to the base 20B in the Y-Z plane direction. That is, the restricting portions 21B restrict the relative movement between the outer spacer 2B and the energy storage device 10 disposed adjacently to the outer spacer 2B in the Y-Z plane direction.

As shown in FIG. 2 and FIG. 3, the holder 3 includes: the pair of terminal members 30 which is disposed at positions adjacent to the outer spacers 2B respectively; and frames 31 which connect the pair of terminal members 30 to each other.

The pair of terminal members 30 extends in the Y-Z plane direction respectively. Each of the pair of terminal members 30 includes: a body 300 having a profile (a rectangular profile in this embodiment) corresponding to the energy storage device 10; and a pressure contact portion 301 which projects toward the base 20B of the outer spacer 2B from the body 300 and is brought into contact with the outer contact portions 202B extending from the base 20B. As described previously, the terminal members 30 of this embodiment are made of metal.

The frames 31 extend in the X axis direction, and connect the pair of terminal members 30 to each other. In the holder 3 of this embodiment, the frames 31 connect both ends in the Y axis direction of the pair of terminal members 30 (bodies 300) to each other. That is, the holder 3 includes the pair of frames 31.

Each frame 31 includes: a first connecting portion 310 extending in the X axis direction at a position which corresponds to the lid plates 121 of the energy storage devices 10 in the Z axis direction; and a second connecting portion 311 extending in the X axis direction at a position which corresponds to the closed portions 123 of the energy storage devices 10 in the Z axis direction. The frame 31 also includes a pair of support portions 312 which extends in the Z axis direction, and connects end portions in the X axis direction of the first connecting portion 310 and the second connecting portion 311 to each other. The frame 31 further includes a reinforcing portion 313 which extends in the Z axis direction, and connects intermediate portions in the X axis direction of the first connecting portion 310 and the second connecting portion 311 to each other. As described above, the end portions of the first connecting portion 310 and the end portions of the second connecting portion 311 are connected to each other by the pair of support portions 312 so that the frame 31 is formed into a frame shape.

Insulators 4 are made of a material having an insulating property. Each insulator 4 is disposed between the frame 31 having conductivity and the plurality of energy storage devices 10. To be more specific, each insulator 4 includes: a first insulating portion 40 extending in the X axis direction and disposed between the first connecting portion 310 and the plurality of energy storage devices 10; and a second insulating portion 41 extending in the X axis direction and disposed between the second connecting portion 311 and the plurality of energy storage devices 10. The insulator 4 also includes a pair of third insulating portions 42 which extends in the Z axis direction and is disposed between the support portions 312 and the energy storage devices 10. The insulator 4 further includes a fourth insulating portion 43 extending in the Z axis direction and disposed between the reinforcing portion 313 and the energy storage device 10. Each of the pair of third insulating portions 42 connects an end portion in the X axis direction of the first insulating portion 40 and an end portion in the X axis direction of the second insulating portion 41 to each other. The fourth insulating portion 43 connects the first insulating portion 40 and the second insulating portion 41 to each other at a position which corresponds to the reinforcing portion 313 in the X axis direction.

As shown in FIG. 1, the cover member 5 is a plate-like member which overlaps, in the Z axis direction, with the plurality of energy storage devices 10 disposed in a row in the X axis direction (that is, covers the plurality of energy storage devices 10 from one side in the Z axis direction). The cover member 5 of this embodiment has an approximately rectangular profile as viewed in the Z axis direction.

Figure 8:
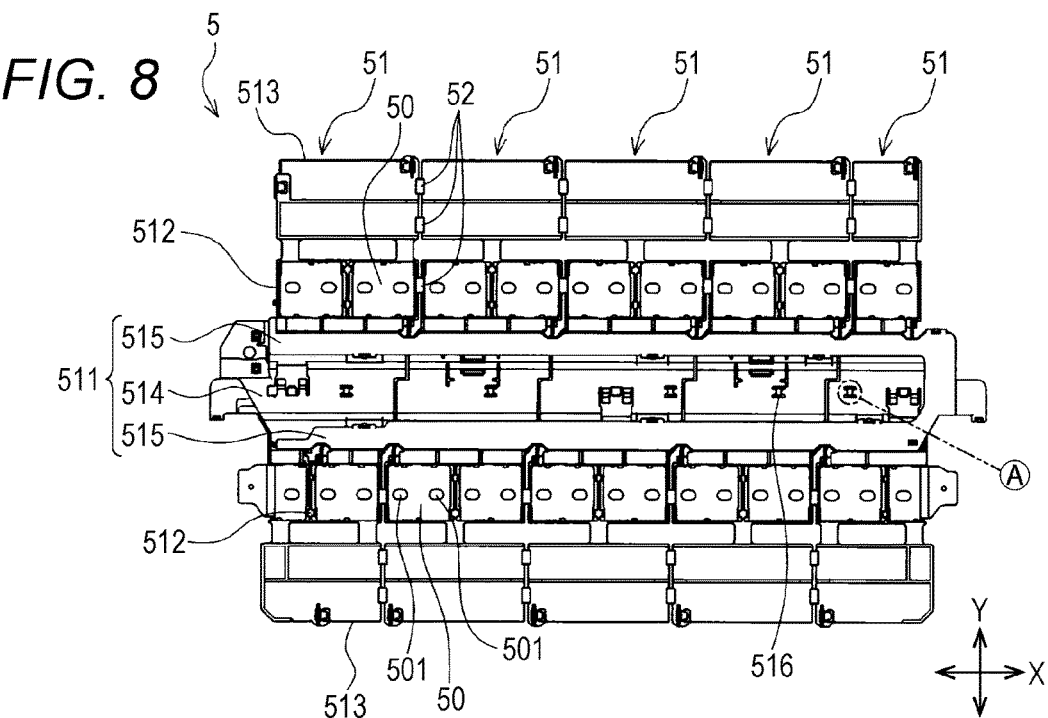
FIG. 8 is a plan view of the cover member.

As shown also in FIG. 8, the cover member 5 includes: a plurality of (five in this embodiment) partitioned portions 51 disposed in a row in the X axis direction; and partitioned portion connecting portions 52 each of which connects the neighboring partitioned portions 51 to each other in the X axis direction. In the cover member 5 of this embodiment, edges of the neighboring partitioned portions 51 which opposely face each other are disposed approximately parallel to each other, and the opposedly facing edges are connected to each other by the partitioned portion connecting portion 52.

Each of the plurality of partitioned portions 51 holds bus bars 50. The bus bar 50 is a plate-like member which is made of a material having conductivity such as metal, and connects the corresponding external terminals 13 of the neighboring energy storage devices 10 to each other in a conductive manner. The bus bar 50 of this embodiment is a thin-plate-like member having a rectangular-shaped profile. The bus bar 50 has a hole 501 at positions overlapping with the external terminals 13 of the neighboring energy storage devices 10 in the Z axis direction respectively. That is, the bus bar 50 has two holes 501. In the energy storage apparatus 1 of this embodiment, hole peripheral portions of the bus bar 50 which define the holes 501 and the external terminals 13 are welded to each other.

Each partitioned portion 51 includes: a wiring portion 511 where electric wires and the like are disposed; holding portions 512 which hold the bus bars 50 on both sides of the wiring portion 511 in the Y axis direction; and plate-like portions 513 which extend in the X-Y plane direction outside the holding portions in the Y axis direction. The partitioned portion 51 of this embodiment is a resin integrally molded product.

The wiring portion 511 includes a first portion 514 (having a rectangular plate-like shape in the example of this embodiment) which extends in the X-Y plane direction, and a pair of second portions 515 which is raised from edges of the first portion 514 in the Y axis direction with respect to the first portion 514. Since the wiring portions 511 are disposed in a row in the X axis direction, a groove-shaped portion extending in the X axis direction is formed at the center portion of the cover member 5 in the Y axis direction. The groove-shaped portion is used as a space for wiring electric wires or the like. In this embodiment, on the wiring portions 511, electric wires or the like which are connected to thermistors disposed between the cover member 5 and the lid plates 121 of the energy storage devices 10 for measuring temperatures of the respective energy storage devices 10 are disposed.

The first portion 514 includes a second connecting portion 516 which engages with the first connecting portion 22A in a state where the movement of the first portion 514 in a direction away from the inner spacer 2A (second spacer 202A) in the Z axis direction is restricted. The second connecting portion 516 is disposed at a position corresponding to the first connecting portion 22A of the second spacer 202A (to be more specific, a position which overlaps with the first connecting portion 22A in the Z axis direction).

Figure 9:
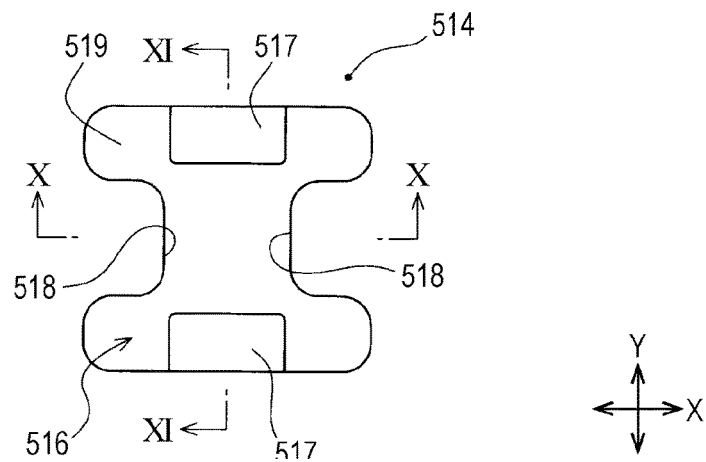
FIG. 9 is an enlarged view of a portion A in FIG. 8.
Figure 10:
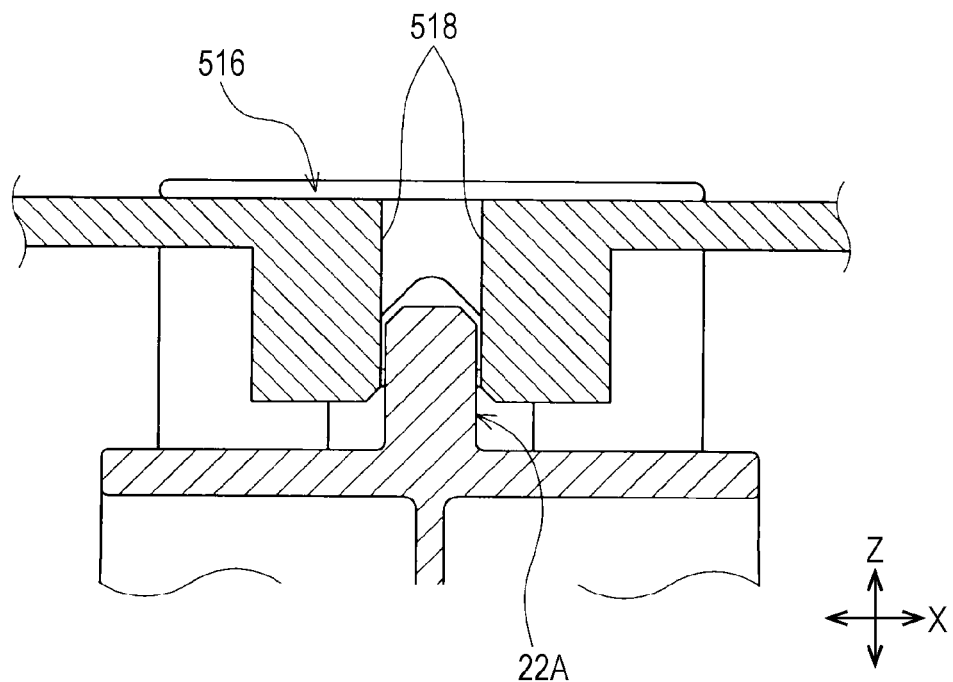
FIG. 10 is a cross-sectional view taken along a line X-X in FIG. 9 showing a state where a first connecting portion and a second connecting portion are engaged with each other.
Figure 11:
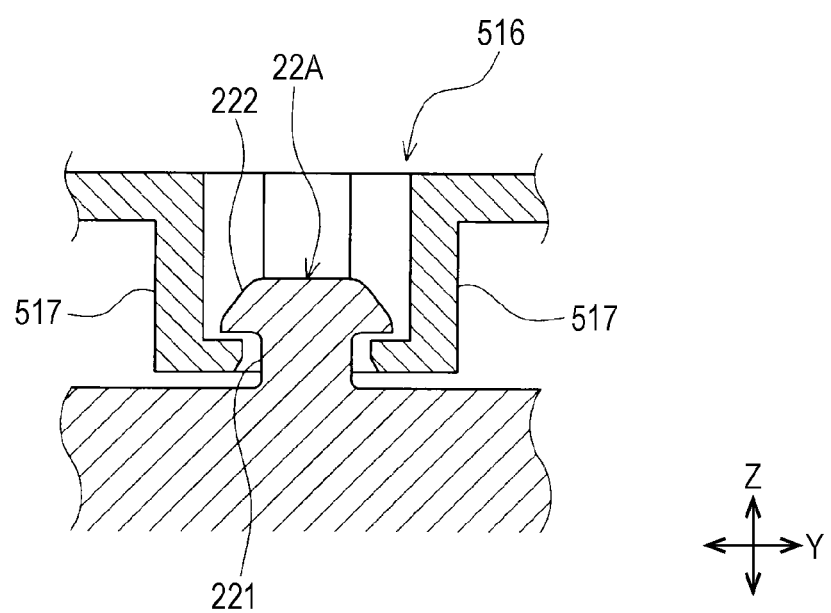
FIG. 11 is a cross-sectional view taken along a line XI-XI in FIG. 9 showing the state where the first connecting portion and the second connecting portion are engaged with each other.

As shown also in FIG. 9 to FIG. 11, the second connecting portion 516 includes: a pair of locking portions 517 which locks the large width portion 222 of the first connecting portion 22A; a pair of contact portions (contact surfaces) 518 which restricts the movement of the first connecting portion 22A in the X axis direction; and gap portions 519 which are disposed adjacently to the pair of locking portions 517 in the X axis direction respectively. FIG. 9 is a view showing only the second connecting portion 516, and FIG. 10 and FIG. 11 are views showing a state where the first connecting portion 22A and the second connecting portion 516 engage with each other.

The pair of locking portions 517 respectively extend toward the inner spacer 2A from the first portion 514. When the cover member 5 engages with the inner spacer 2A, the pair of locking portions 517 are elastically deformed such that a distance between distal ends of the pair of locking portions 517 is increased in the Y axis direction and hence, the locking portions 517 are allowed to pass the large width portion 222 of the first connecting portion 22A. After the locking portions 517 are allowed to pass the large width portion 222 of the first connecting portion 22A, the locking portions 517 are elastically restored so that the distal end portions of the locking portions 517 return to the initial position whereby the locking portions 517 lock the large width portion 222. Due to such locking, the movement of the cover member 5 in the direction away from the inner spacer 2A (second spacer 202A) in the Z axis direction is restricted. In this embodiment, the pair of locking portions 517 are L-shaped portions whose distal ends extend in directions in which the distal ends approach each other.

The pair of contact portions 518 is brought into contact with the first connecting portion 22A from both sides in the X axis direction. To be more specific, the pair of contact portions 518 sandwiches the first connecting portion 22A from both sides in the X axis direction in a state where the large width portion 222 is locked by the pair of locking portions 517. In such a state, the pair of contact portions 518 is brought into contact with distal ends of the pair of projecting portions 223 in the X axis direction. Accordingly, the pair of contact portions 518 restricts the movement of the first connecting portion 22A in the X axis direction.

On the second connecting portion 516, two gap portions 519 are formed adjacently to both sides (both sides in the Y axis direction in the example of this embodiment) of one locking portion 517 out of the pair of locking portions 517, and two gap portions 519 are formed adjacently to both sides of the other locking portion 517 out of the pair of locking portions 517. Due to the formation of these gap portions 519, at the time of making the cover member 5 engage with the inner spacer 2A, the second connecting portion 516 can be easily elastically deformed thus facilitating the expansion of a distance between the distal ends of the pair of locking portions 517 in the Y axis direction.

Returning to FIG. 8, each holding portion 512 is a prismatic cylindrical portion which holds the bus bar 50 by surrounding the peripheral edges of the bus bar 50. Further, each plate-like portion 513 is a portion which covers the energy storage devices 10 and the like outside the holding portion 512 in the Y axis direction.

Each partitioned portion connecting portion 52 is elastically deformable so that the partitioned portions 51 which are connected to each other by the partitioned portion connecting portion 52 are allowed to be close to each other or to be away from each other in the X axis direction due to the elastic deformation. In this embodiment, the partitioned portion connecting portion 52 is a resin U-shaped portion. In the cover member 5 of this embodiment, the neighboring partitioned portions 51 are connected to each other by the plurality of partitioned portion connecting portions 52.

The energy storage apparatus 1 having the above-mentioned configuration is manufactured as follows.

As shown in FIG. 1 to FIG. 3, the energy storage device 10 and the inner spacer 2A are disposed alternately in the X axis direction. Subsequently, the pair of outer spacers 2B is disposed such that the outer spacers 2B sandwich the entirety of the energy storage devices 10 and the inner spacers 2A which are disposed alternately from the outside in the X axis direction. At this stage of the manufacturing operation, in a row of the plurality of inner spacers 2A each of which is disposed between the neighboring energy storage devices 10, the inner spacers 2A are disposed in a row in the X axis direction, the second spacers 202A are disposed at positions corresponding to the second connecting portions 516 of the cover member 5, and each first spacer 201A is disposed between the second spacers 202A.

Subsequently, the energy storage devices 10 and the spacers (the inner spacers 2A and the outer spacers 2B) are collectively held by the holder 3. To be more specific, the terminal members 30 are disposed outside the outer spacers 2B respectively, and the pair of terminal members 30 are connected to each other by the pair of frames 31. At this stage of the manufacturing operation, the insulators 4 are disposed between the frames 31 and the plurality of energy storage devices 10 respectively (see FIG. 2).

Next, the cover member 5 is mounted. To be more specific, the first connecting portions 22A of the second spacers 202A and the corresponding second connecting portions 516 of the cover member 5 are made to engage with each other by fitting engagement (see FIG. 10 and FIG. 11). With such an operation, portions of the plurality of energy storage devices 10 on a lid plate 121 side which are held by the holder 3 are covered by the cover member 5. At this stage of the manufacturing operation, each of the plurality of bus bars 50 which are held by the cover member 5 extends (straddles) between the external terminals 13 of the neighboring energy storage devices 10 such that the plurality of energy storage devices 10 held by the holder 3 are connected to each other in series.

In such a state, the peripheral portions of the holes 501 formed in the bus bars 50 and the external terminals 13 are welded to each other (by laser welding in the example of this embodiment) so that the energy storage apparatus 1 is completed.

According to the energy storage apparatus 1 described above, the cover member 5 is fixed to the second spacers 202A in a state where the cover member 5 cannot be separated from each second spacer 202A in the Z axis direction disposed at the intermediate position in the Y axis direction of the end portion of the second spacer 202A in the Z axis direction disposed between the energy storage devices 10. With such a configuration, lifting of the center portion of the cover member 5 in the Y axis direction and the like can be suppressed and hence, variations in size at respective positions of the energy storage apparatuses 1 (that is, variations in size in the Z axis direction at respective positions of the energy storage apparatuses 1 in the X axis direction) can be suppressed.

In the energy storage apparatus 1 of this embodiment, the second connecting portion 516 includes the pair of contact portions 518 which is brought into contact with the first connecting portion 22A from both sides in the X axis direction (see FIG. 10) and hence, the movement of the second spacer 202A in the X axis direction can be suppressed. Accordingly, when acceleration in the X axis direction is applied to the energy storage apparatus 1, it is possible to prevent the energy storage device 10 which is disposed on an outermost side opposite to a side where the acceleration is generated from receiving forces (inertial forces) or the like attributed to the acceleration of other energy storage devices 10 in a concentrated manner.

Further, in the energy storage apparatus 1 of this embodiment, the second spacers 202A are disposed every other storage device or every two or more storage devices 10 in the plurality of inner spacers 2A which are disposed in a row in the X axis direction, and the second connecting portions 516 of the cover member 5 are disposed at positions corresponding to the first connecting portions 22A of the second spacers 202A respectively. Accordingly, the movement of the inner spacers 2A in the X axis direction is restricted at the plurality of portions in the X axis direction. With such a configuration, forces (inertial force and the like) which are applied to the respective energy storage devices 10 and the like when the acceleration in the X axis direction is generated on the energy storage apparatus 1 can be further dispersed.

The cover member 5 of this embodiment holds the bus bars 50 each of which connects the corresponding external terminals 13 to each other. At the same time, the cover member 5 also includes the second connecting portion 516 which engages with the first connecting portion 22A disposed at an intermediate position in the Y axis direction of the end portion in the Z axis direction of at least one inner spacer 2A (second spacer 202A) out of the plurality of inner spacers 2A in a state where the movement of the cover member 5 in the direction away from the inner spacer 2A (second spacer 202A) in the Z axis direction is restricted.

With such a configuration, in manufacturing the energy storage apparatus 1, by covering the plurality of energy storage devices 10 disposed in a row in the X axis direction by the cover member 5 such that the second connecting portions 516 engage with the first connecting portions 22A of the second spacers 202A, lifting of the center portion of the cover member 5 in the Y axis direction or the like can be suppressed. Accordingly, lifting of the bus bars 50 which the cover member 50 holds from the external terminals 13 of the respective energy storage devices 10 can be prevented (that is, the bus bars 50 and the external terminals 13 are brought into close contact with each other) and hence, welding of the bus bars 50 and the external terminals 13 to each other can be easily and accurately performed.

On the cover member 5 of this embodiment, the plurality of second connecting portions 516 are disposed at intervals in the X axis direction. That is, the second spacers 202A each having the first connecting portion 22A are disposed every other storage device or every two or more storage devices 10 in the plurality of inner spaces 2A disposed in a row in the X axis direction. Accordingly, in manufacturing the energy storage apparatus 1, by covering the plurality of energy storage devices 10 disposed in a row in the X axis direction by the cover member 5 such that the second connecting portions 516 which correspond to the first connecting portions 22A respectively are made to engage with the respective first connecting portions 22A, the positions of the plurality of energy storage devices 10 are allocated more properly in the X axis direction. Accordingly, the relative positions of the bus bars 50 which the cover member 5 holds and the external terminals 13 to which the bus bars 50 are to be welded become closer to the predetermined relative positions (designed values) so that the bus bars 50 and the external terminals 13 can be welded to each other more easily and accurately.

The cover member 5 of this embodiment is divided into the plurality of partitioned portions 51 disposed in a row in the X axis direction, and the neighboring partitioned portions 51 are connected to each other by the connecting portions such that the neighboring partitioned portions 51 become close to each other or away from each other. With such a configuration, even when a distance between the second spacer 202A and the second spacer 202A is deviated from a predetermined size (designed value) due to the expansion, shrinkage or the like of the energy storage device 10, the first connecting portion 22A and the second connecting portion 516 can be easily engaged with each other by changing a distance between the partitioned portions 51. Accordingly, in manufacturing the energy storage apparatus 1, it is possible to suppress an influence of the expansion and shrinkage of the energy storage device 10 exerted on the relative positions of the bus bars 50 and the external terminals 13 to which the bus bars 50 are to be welded when the plurality of energy storage devices 10 disposed in a row in the X axis direction are covered by the cover member 5. As a result, in manufacturing the energy storage apparatus 1, the relative positions of the bus bars 50 and the external terminals 13 can be made closer to the predetermined relative positions so that the bus bars 50 and the external terminals 13 can be welded to each other more accurately and with certainty.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

Specific shape of the pair of locking portions 517 of the second connecting portion 516 is not limited. Although the pair of locking portions 517 of the above-mentioned embodiment is respectively the L-shaped portions, the locking portions 517 may have other shapes provided that the locking portions 517 can engage with the first connecting portion 22A in a state where the movement of the cover member 5 in the direction away from the second spacer 202A in the Z axis direction is restricted.

In the energy storage apparatus 1 of the above-mentioned embodiment, one first connecting portion 22A of the second spacer 202A is formed on the first end of the base 20A. However, the present invention is not limited to such a configuration. The plurality of first connecting portions 22A may be formed on the first end of the base 20A. In this case, the second connecting portions 516 of the cover member 5 are disposed at positions respectively corresponding to the respective first connecting portions 22A disposed in a row in the Y axis direction. With such a configuration, the cover member 5 is fixed to the second spacers 202A in a state where the cover member 5 cannot be spaced apart from the second spacers 202A in the Z axis direction at a plurality of positions in the Y axis direction at the first ends of the bases 20A of the second spacers 202A each of which is disposed between the energy storage devices 10. With such a configuration, lifting of the center portion of the cover member 5 in the Y axis direction or the like can be suppressed with more certainty and hence, variations in size at respective positions of the energy storage apparatus 1 (that is, variations in size in the Z axis direction at respective positions of the energy storage apparatus 1 in the X axis direction) can be suppressed with more certainty.

In the energy storage apparatus 1 of the above-mentioned embodiment, the first connecting portion 22A projects from the base 20A of the second spacer 202A, and the first connecting portion 22A is fitted into the second connecting portion 516 of the cover member 5. However, the present invention is not limited to such a configuration. The present invention may be configured such that the first connecting portion 22A projects from the first portion 514 or the like of the cover member 5, and the first connecting portion 22A is fitted into the second connecting portion 516 or the like formed in the base 20A of the second spacer 202A.

In the energy storage apparatus 1 of the above-mentioned embodiment, the second connecting portion 516 of the cover member 5 includes the pair of locking portions 517 and the pair of contact portions 518. However, the present invention is not limited to such a configuration. The second connecting portion 516 may include only the pair of locking portions 517. Also with such a configuration, the cover member 5 is fixed to the second spacer 202A in a state where the cover member 5 cannot be spaced apart from the second spacers 202A in the Z axis direction at intermediate portions in the Y axis direction of the first ends of the bases 20A of the second spacers 202A each of which is disposed between the energy storage devices 10.

The inner spacers 2A of the energy storage apparatus 1 of the above-mentioned embodiment include the first spacers 201A each of which does not have the first connecting portion 22A. However, the present invention is not limited to such a configuration. All inner spacers 2A may have the first connecting portion 22A. In this case, the first connecting portion 22A of at least one of the inner spacers 2A may not be connected with the cover member 5.

In the cover member 5 of the energy storage apparatus 1 of the above-mentioned embodiment, each partitioned portion connecting portion 52 is elastically deformable so that the neighboring partitioned portions 51 are allowed to be close to each other or to be away from each other. However, the present invention is not limited to such a configuration. For example, the present invention may be configured such that the neighboring partitioned portion connecting portions 52 have a hinge portion so that the neighboring partitioned portions 51 are allowed to be close to each other or to be away from each other due to pivoting or bending of the hinge portion.

Figure 12:
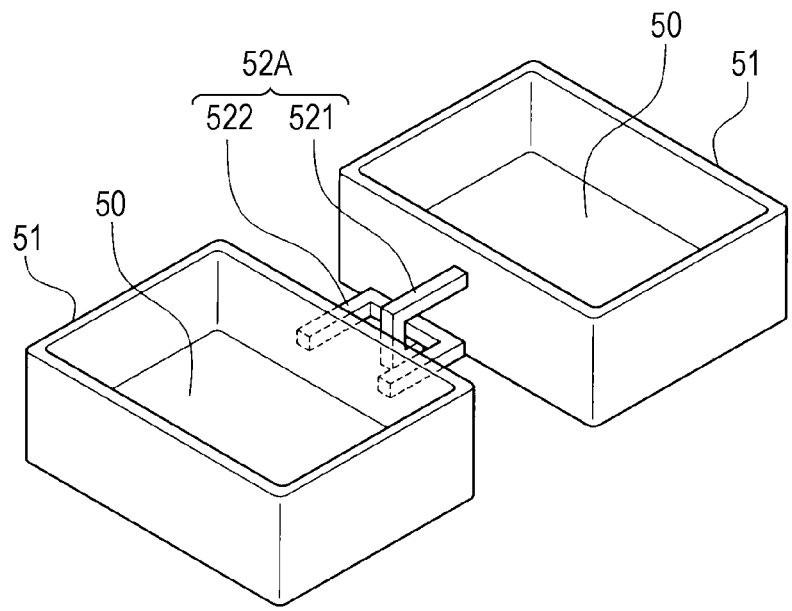
FIG. 12 a schematic view describing a partitioned portion connecting portion of a cover member according to another embodiment.
Figure 13:
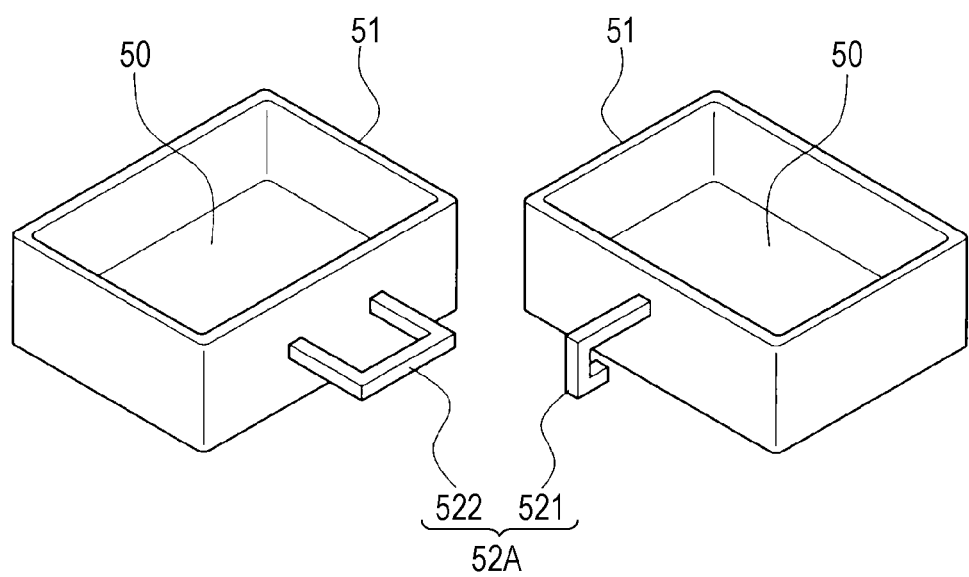
FIG. 13 is a schematic view for describing a partitioned portion connecting portion of a cover member according to another embodiment.
Figure 14:
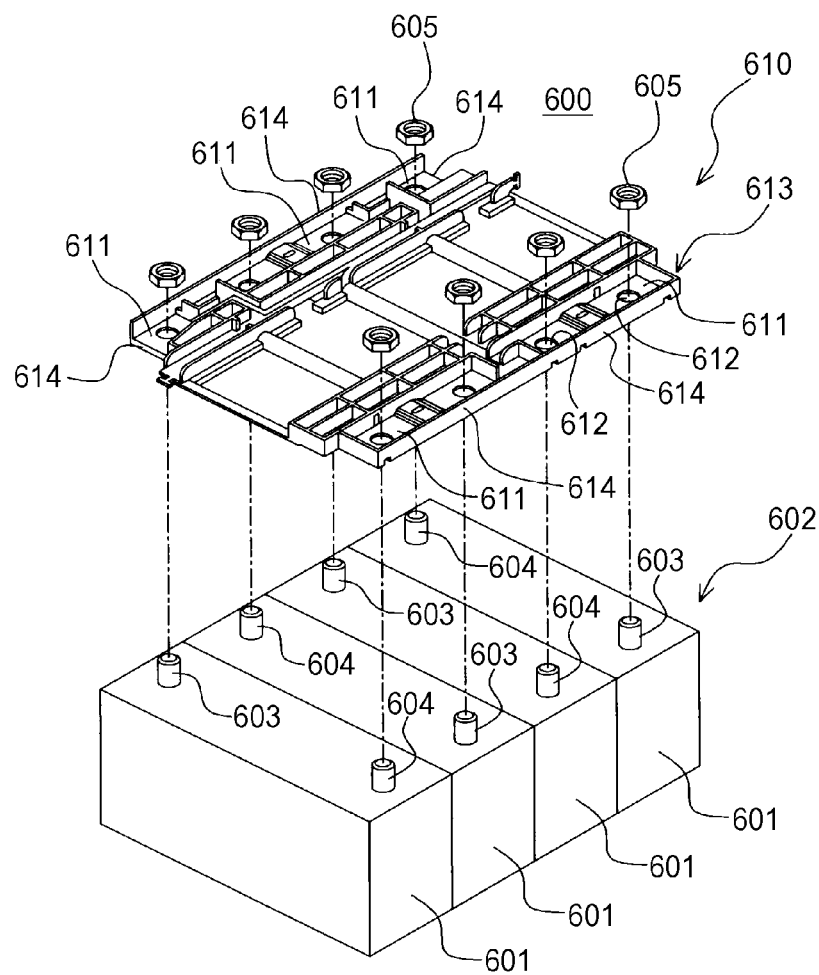
FIG. 14 is a developed perspective view of a conventional power source apparatus.

As shown in FIG. 12 and FIG. 13, a partitioned portion connecting portion 52A may have a pawl portion 521 which is bent or curved in a hook shape, and an accommodating portion 522 having a larger size in the X axis direction than that of the pawl portion 521, and the neighboring partitioned portions 52 may be allowed to be close to each other or away from each other by accommodating the pawl portion 521 in the accommodating portion 522. In such a configuration, the pawl portion 521 can be displaced in the inside of the accommodating portion 522 in the X axis direction. Accordingly, the partitioned portion connecting portion 52A may be configured to be fixed by making the pawl portion 521 locked with the partitioned portion 51 to which the accommodating portion 522 is formed or with a portion of the accommodating portion 522 when the neighboring partitioned portions 51 approach each other by a distance larger than a predetermined distance.

In the cover member 51, the plurality of partitioned portions 51 may be formed as an integral body. Alternatively, the plurality of partitioned portions 51 may be formed as separate bodies respectively and the partitioned portions 51 may be mechanically connected to each other.

The present invention can be carried out in the following forms.

(1) An energy storage apparatus which includes:
a spacer;
an energy storage device disposed adjacently to the spacer in a first direction and having an external terminal on an end surface thereof in a second direction orthogonal to the first direction; and
a cover member holding a bus bar connected to the external terminals and extending along the end surface of the energy storage device having the external terminal,
wherein the spacer has a first connecting portion to which the cover member is connected on an end portion thereof in the second direction, and
the cover member has a second connecting portion which engages with the first connecting portion in a state where movement of the cover member in a direction away from the spacer in the second direction is restricted.

(2) The energy storage apparatus described in the above-mentioned (1), wherein one of the first connecting portion and the second connecting portion has a pair of contact surfaces which is brought into contact with the other of the first connecting portion and the second connecting portion from both sides in the first direction.

(3) The energy storage apparatus described in the above-mentioned (1) or (2), wherein the spacer is formed of a plurality of spacers disposed in a row in the first direction,
at least two spacers among the plurality of spacers respectively have the first connecting portion, and
the cover member has a plurality of second connecting portions disposed at positions respectively corresponding to the first connecting portions of the at least two spacers having the first connecting portions.

(4) The energy storage apparatus described in any one of the above-mentioned (1) to (3), wherein the cover member includes a plurality of partitioned portions disposed in a row in the first direction, and connecting portions connecting the neighboring partitioned portions to each other and allowing the partitioned portions connectable to each other and separable from each other in the first direction, and
the plurality of partitioned portions are configured to respectively hold the bus bars.

(5) The energy storage apparatus described in any one of the above-mentioned (1) to (4), wherein the second connecting portion of the cover member has a locking portion which locks the first connecting portion, and a gap portion disposed adjacently to the locking portion as viewed in the second direction.

(6) The energy storage apparatus described in any one of the above-mentioned (1) to (5), wherein the first connecting portion has: a base portion extending from an end portion of the spacer in the second direction; and a large width portion connected to a distal end of the base portion and having a larger size on a surface orthogonal to the second direction than the base portion.

(7) A cover member of an energy storage apparatus which includes a spacer and an energy storage device disposed adjacently to the spacer in a first direction and having an external terminal on an end surface thereof in a second direction orthogonal to the first direction, the cover member extending along the end surface of the energy storage device having the external terminal, wherein
the cover member comprises:
a bus bar connected to the external terminal; and
a second connecting portion configured to hold the bus bar and to engage with a first connecting portion formed on an end portion of the spacer in the second direction in a state where movement of the cover member in a direction away from the spacer in the second direction is restricted.

(8) A method of manufacturing an energy storage apparatus including: a spacer; an energy storage device disposed adjacently to the spacer in a first direction and having an external terminal on an end surface thereof in a second direction orthogonal to the first direction; and a cover member holding a bus bar connected to the external terminal and extending along the end surface of the energy storage device having the external terminal, wherein the spacer has a first connecting portion to which the cover member is connected on an end portion thereof in the second direction, and the cover member has a second connecting portion which engages with the first connecting portion in a state where movement of the cover member in a direction away from the spacer in the second direction is restricted, the method including:
engaging the first connecting portion and the second connecting portion with each other; and
welding the bus bar and the external terminal to each other after the engagement of the first connecting portion and the second connecting portion.

(9) The method of manufacturing an energy storage apparatus described in the above-mentioned (8), wherein the method includes:
disposing at least one spacer and the plurality of energy storage devices such that the spacer and the energy storage devices are disposed alternately in the first direction before the engagement of the first connecting portion and the second connecting portion; and
regulating the relative positions of the plurality of energy storage devices and the cover member in the first direction between the engagement of the first connecting portion and the second connecting portion and the welding of the bus bar and the external terminal, and
the cover member includes: a plurality of partitioned portions disposed in a row in the first direction in a state where each of the plurality of partitioned portions holds the bus bar; and a connecting portion which connects the neighboring partitioned portions to each other and allows the partitioned portions to be connectable to each other and separable from each other in the first direction, and
regulation of the relative positions in the first direction between the plurality of energy storage devise and the cover member is performed by changing a distance between the partitioned portions.

What is claimed is:
1. An energy storage apparatus comprising:
a spacer;

an energy storage device disposed adjacently to the spacer in a first direction and having an external terminal on an end surface thereof in a second direction orthogonal to the first direction; and a cover member holding a bus bar connected to the external terminal and extending along the end surface of the energy storage device having the external terminal, wherein the spacer has a first connecting portion to which the cover member is connected on an end portion thereof in the second direction, and the cover member has a second connecting portion which engages with the first connecting portion in a state where movement of the cover member in a direction away from the spacer in the second direction is restricted, wherein the first connecting portion is disposed on the end portion of spacer at an intermediate position in a third direction orthogonal to the first and the second directions.

2. The energy storage apparatus according to claim 1, wherein one of the first connecting portion and the second connecting portion has a pair of contact surfaces which is brought into contact with the other of the first connecting portion and the second connecting portion from both sides in the first direction.

3. The energy storage apparatus according to claim 1, wherein the spacer is formed of a plurality of spacers disposed in a row in the first direction, at least two spacers among the plurality of spacers respectively have the first connecting portion, and the cover member has a plurality of second connecting portions disposed at positions respectively corresponding to the first connecting portions of the at least two spacers having the first connecting portions.

4. The energy storage apparatus according to claim 1, wherein the cover member includes a plurality of partitioned portions disposed in a row in the first direction, and connecting portions connecting the neighboring partitioned portions to each other and allowing the partitioned portions connectable to each other and separable from each other in the first direction, and the plurality of partitioned portions are configured to respectively hold the bus bars.

5. The energy storage apparatus according to claim 1, wherein the second connecting portion of the cover member comprises:

a locking portion which locks the first connecting portion; and a gap portion disposed adjacently to the locking portion as viewed in the second direction.

6. The energy storage apparatus according to claim 1, wherein the first connecting portion comprises:

a base portion extending from the end portion of the spacer in the second direction; and a large width portion connected to a distal end of the base portion and having a larger size on a surface orthogonal to the second direction than the base portion.

7. A cover member of an energy storage apparatus which includes a spacer and an energy storage device disposed adjacently to the spacer in a first direction and having an external terminal on an end surface thereof in a second direction orthogonal to the first direction, the cover member extending along the end surface of the energy storage device having the external terminal, wherein the cover member comprises:

a bus bar connected to the external terminal; and a second connecting portion configured to hold the bus bar and to engage with a first connecting portion formed on an end portion of the spacer in the second direction in a state where movement of the cover member in a direction away from the spacer in the second direction is restricted, wherein the second connecting portion is disposed on the cover member at an intermediate position in a third direction orthogonal to the first and the second directions.

8. The energy storage apparatus according to claim 1, wherein the first connecting portion projects from the end portion in the second direction.

9. The energy storage apparatus according to claim 1, wherein the first connecting portion is inserted into the second connecting portion.

10. The energy storage apparatus according to claim 1, wherein the cover member comprises:

a plurality of partitioned portions which are disposed in a row in the first direction and hold the bus bars, respectively; and a connecting portion connecting neighboring partitioned portions of the plurality of partitioned portions to each other and allowing the neighboring partitioned portions to move relative to each other in the first direction.

11. The energy storage apparatus according to claim 10, wherein the connecting portion of the cover member is elastically deformable.

12. The energy storage apparatus according to claim 1, wherein the cover member comprises a wiring portion and the second connecting portion is formed in the wiring portion.

13. The energy storage apparatus according to claim 2, wherein the pair of contact surfaces project downward in the second direction from an upper surface of the cover member.

14. The energy storage apparatus according to claim 5, wherein the locking portion projects downward from an upper surface of the cover member.

15. The energy storage apparatus according to claim 5, wherein the locking portion of the second connecting portion is formed between the large width portion of the first connecting portion and the end portion of the spacer to restrict the movement of the cover member.

16. The energy storage apparatus according to claim 5, wherein the locking portion comprises a pair of locking portions which are elastically deformable in the third direction, and wherein when the pair of locking portions engage the first connecting portion, a distance between distal ends of the pair of locking portions is increased in the third direction to allow the pair of locking portions to pass over a large width portion of the first connecting portion.

17. The energy storage apparatus according to claim 16, wherein the pair of locking portions comprises a first tapered surface, and the first connecting portion comprises a second tapered surface, and wherein when the pair of locking portions engages the first connecting portion, the first tapered surface contacts the second tapered surface.

18. The energy storage apparatus according to claim 6, wherein the first connecting portion comprises a pair of projecting portions which project oppositely in the first direction from at least one of the base portion and the large width portion.

* * * * *